INVENTOR
EARL E. GRABLE
BY
ATTORNEYS

March 3, 1970  E. E. GRABLE  3,498,180
RECESS MILLING ATTACHMENT
Filed April 2, 1968  4 Sheets-Sheet 2

INVENTOR
EARL E. GRABLE
BY
ATTORNEYS

INVENTOR
EARL E. GRABLE
BY
ATTORNEYS

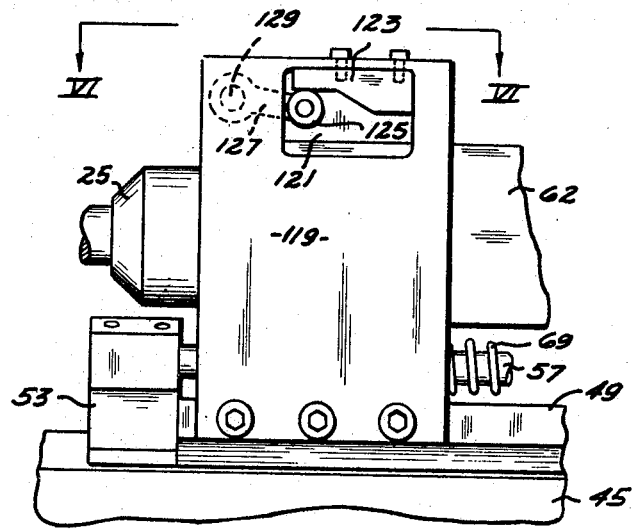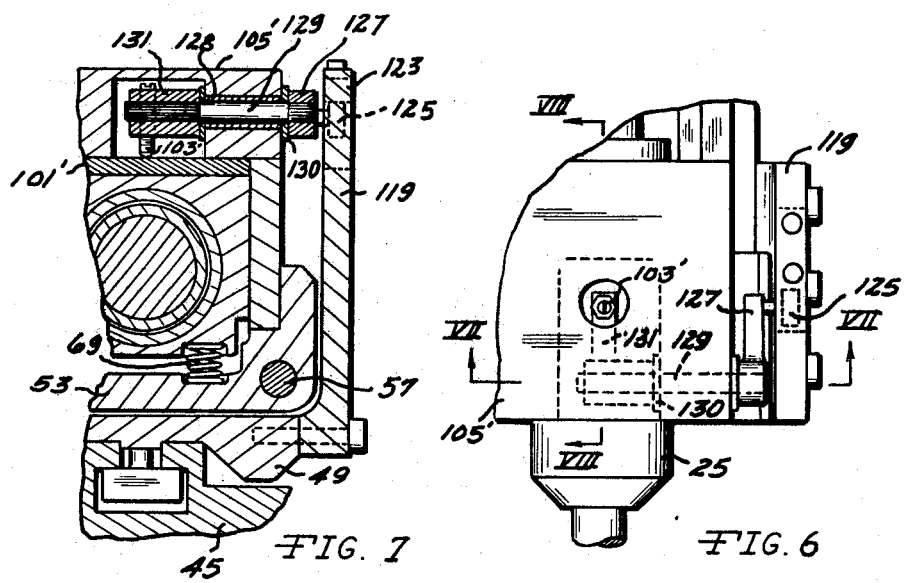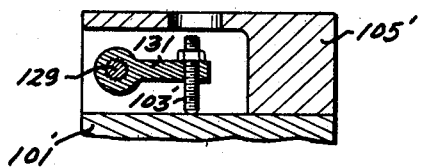

United States Patent Office 3,498,180
Patented Mar. 3, 1970

3,498,180
RECESS MILLING ATTACHMENT
Earl E. Grable, 1223 W. Miller Road,
Lansing, Mich. 48910
Filed Apr. 2, 1968, Ser. No. 718,104
Int. Cl. B23c 3/28, 3/32, 1/00
U.S. Cl. 90—11.4                                                10 Claims

ABSTRACT OF THE DISCLOSURE

A tool holder for automatic screw machines. The holder is adapted to hold recess milling tools and mounts to an end tool slide of the screw machine. It engages also with the draw bar (in the usual fashion), and the drive shaft of the machine. The tool spindle of the apparatus is swing actuated to cut independently of the feed motion of the tool slide. The transmission means for the rotary drive is provided with a universal joint to permit the recess swing of the tool, and also to allow lateral offset of the spindle axis, as compensation for various factors.

---

Recess milling attachments are well known. Standard (i.e. nonrevolving) recessing tools have been utilized for many years. Subsequent developments introduced the more structurally complex milling (i.e. revolvingly driven) attachments. The latter are adapted to mount upon an end tool slide of a multiple spindle automatic screw machine and to chuck a rotary driven tool, particularly a recess milling tool. "Recess" tool is here intended to mean a tool that is fed axially into the bored end of bar stock, and then fed laterally to recess the interior of the stock. The axial feed is hereinafter referred to as "tool feed," and the lateral feed as "recess feed." The term "milling," as already mentioned above, indicates a tool that is rotationally driven, as opposed to a standard recessing tool where the cutting motion is generated solely by rotation of the work stock and the tool is rotationally stationary.

The background for the present invention may be understood from a pictorial representation of a recess milling attachment (manufacturer's full page advertisement) is page 12 of "Automatic Machining": October 1967. This picture is exemplary of the present state of the recess milling art, and specifically shows the prior means for accomplishing recess feed in proper timed relation with the tool feed. These means comprise an inclined plane or ramp engagement between a spindle journal block and a lower mounting or base block. The entire apparatus feeds axially toward the workpiece until a draw bar arrests the axial movement of the journal block. At this point the relative movement between the base block and the journal block, by a sort of wedge effect, imparts a lateral motion to the latter, which constitutes the recess feed of the tool. Many problems are inherent in such an apparatus as will now be described:

The above described prior art ramp type recessing mill attachment requires a very close tolerance fit between mated dove tail tracks on the faces of the sliding ramps. This tight tolerance must be retained in order to prevent sloppiness, or play, between the two faces. If permitted, such play would interfere with control of both the depth and size of the recess formed (the size of a recess is its diameter, and its depth is the dimension at a right angle to a diameter).

In addition to requiring a very closely fitted slide track, the sliding contact faces of the ramps necessitate extensive surfaces in heavy frictional contact during the recess feed. This frictional surface is further increased by the dove tailed track means as seen in the literature cited. Not only is such a dove tailed interlock an expensive proposition, but it is difficult to lubricate and difficult to maintain due to wearing away of the precision fit. The frictional surfaces develop an excessive drag against the lateral translation of recess feed. This results in excessive loads applied to the entire drive train of the automatic screw machine, including the draw bar means, reciprocating turret and spindles, cams, etc. Not only does the frictional ramp resistance place undue loads on the driving mechanism, but it also represents an inherent drag or resistance to return of the tool ramp (i.e. recess feed-out). If the recess feed-out is proceeding at high speed, the frictional resistance between the ramps substantially opposes the natural tendency of the upper ramp to slide back down the face of the lower ramp. The problem is compounded by the inertia of the massive journal block, which opposes acceleration of the block down the ramp. The overall effect is that the response of the tool to recess feed-out is much too slow and the sudden feed-out of the tool pulls it through the workpiece and mutilates it. In order to meet this problem, screw machines are set up to perform recess feed-out at a low speed until the tool has responded and withdrawn from the recess. The machine then shifts into high speed tool feed-out. The slow speed portion of the cycle contributes a time delay in the neighborhood of as much as 3.0 seconds per cycle. Although seemingly small, in a job involving a large number of parts, as many as, say 360,000 cycles, the extra time required for the job, due to the necessary slow pull out, would equal 600 extra hours. Such an increased time is prohibitively costly, especially in the present day competitive environment of small machine shops supplying large manufacturers, as for example the automobile industry. In this situation, the added cost of labor, additional machine wear, and the time delay itself, easily means the difference between a substantially profitable or unprofitable job.

A still further problem which inheres in the prior, ramp actuated attachments, is the dependence between the size and depth of the recess formed. That is, the depth of the recess is determined by the positioning of the arresting nut on the end of the draw bar. Changing the adjustment of this nut changes the point in the travel of the tool slide at which recess feed-in is initiated. If this point occurs closer to the end of tool slide travel, the resulting recess size will be accordingly smaller; and of course the converse is also true. In other words, the size and depth of the recess are not independent; changing the dimension of one necessitates a compensating change in the other, which is clearly an undesirable feature.

Another drawback of present recess milling attachments is that both the recess feed and tool feed are activated by the tool slide. This causes varying tool pressures during tool motion, since recess feed occurs suddenly at some point of the tool feed. This non-uniform loading detracts from precision in holding the size of the recess.

Still further disadvantages of known attachments are as follows: the recess feed rate is dependent upon the tool feed rate; the spindle axis cannot be adjustably offset to compensate for tool irregularities; and finally, no means are provided for rapid and simple installation of the attachment to a variety of different screw machines.

SUMMARY OF THE INVENTION

My invention completely eliminates and solves all of the above described problems, in the following fashion:

The later or recess feed of the tool in my invention is not accomplished by relative motion between inclined plane surfaces. Instead, the tool is chucked in a spindle which is pivotally suspended frame a frame. The recess feed is developed by pivotally swinging the spindle unit away from the direction of tool feed. Therefore there is no physical dependence between the tool feed and recess feed. From this feature alone it follows that all of the above problems described as associated with the closely fitted, sliding wedge surfaces, are completely eliminated. The friction problems are obviated, as are expensive constructions requiring high precision fits. There is no inherent drag, or binding backlash from feeding the tool out from the work piece at too high a speed. The entire feed cycle may be executed at high speed.

The recess feed being activated independently of the tool feed, there is no sudden extra force applied to the machine feed structure, i.e. the cams, turret, spindles, etc. Consequently my invention endows the associated machine with superior maintenance characteristics, and, more importantly, increased control of recess depth and size.

Feed rates and distances of the recess cycle are independent of the tool feed cycle; the spindle axis may be selectively offset; and the apparatus is provided with an interchangeable adapter base plate so that the entire unit may be installed upon an configuration of tool slide, and hence be used on a variety of different machines.

Accordingly the objects of this invention are as follows:

To provide a recess milling attachment which does not require precision fitted ramp surfaces, nor lubrication thereof, and which is consequently much easier and cheaper to manufacture and maintain.

To provide a recess milling attachment which incorporates a swing type style spindle, and permits greatly improved control of dimensions in recess milling.

To provide a recess milling attachment in which the entire feed cycle may be conducted at high speed thereby achieving a reduction in job time, and a consequent maximization of profits.

To introduce a recess milling attachment in which recess feed forces are not transmitted to the tool slide, thereby to improve dimensional control and reduce machine maintenance.

To teach a recess milling attachment in which size and depth adjustments of the recess are independent of each other.

To introduce a recess milling attachment in which the recess feed rate and tool feed rate are independent.

To teach a recess milling attachment in which the tool spindle may be axially offset from a normal position to compensate for tool and other irregularities.

To disclose a recess milling attachment which may be easily adapted to any configuration of automatic screw machine turrets.

Still other objects will be apparent to those skilled in the art, upon reading the present description, drawings and claims.

In the drawings:

FIGURE 1 is an exploded assembly view of the apparatus of the present invention (except that the spindle carrier assembly is not exploded). Included in the view are the base plate, traverse rods and their support structure, the main frame assembly, swing spindle assembly, rotary drive means, axial and lateral positioning springs, spindle bearings, rotary spindle drive means, spindle swing lever assembly, and draw bar parts.

FIGURE 5 is a side elevation view of a modification of the present invention, showing a swing drive which is actuated directly from the feed of the tool slide, rather than a cross slide, and shows a selectable, replaceable cam mounted on an auxiliary plate, and a cam following roller arm.

FIGURE 6 shows a fragmentary top plan view of the invention, taken at lines VI—VI of FIGURE 5, and shows in phantom line the mechanical linkage connecting the roller arm to a swing lever.

FIGURE 7 is a fragmentary sectional view of the present invention taken on line VII—VII of FIGURE 6, and shows the entire modified swing drive, including the mounting of an auxiliary support plate therefor.

FIGURE 8 is a fragmentary sectional view taken on lines VIII—VIII of FIGURE 6.

DESCRIPTION OF PREFERRED EMBODIMENT

Figure 2:
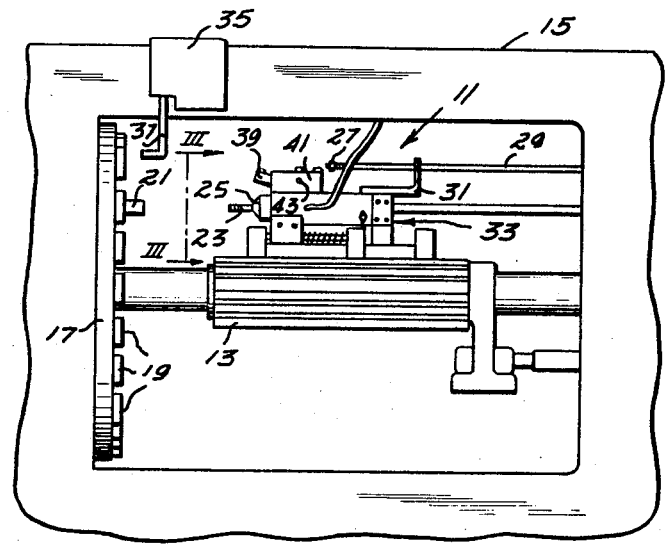
FIGURE 2 is a side elevation view of the multiple spindle turret of an automatic screw machine, showing the recess milling attachment of the present invention attached to one of the tool slides on the turret.

The unit of my invention is denoted generally in FIGURE 2 by the numeral 11, and is there shown attached to the multiple spindle turret 13 of an automatic screw machine 15, of which only a portion is shown. At the left is seen the work turret 17 of the machine, with a plurality of work spindles 19. A work piece 21 is shown extending from one of such spindles, toward the end tool 23 carried by the spindle 25. Recessing is accomplished by feeding the tool 23 into pre-bored or otherwise hollowed work stock 21, and then laterally displacing (recess feeding) the tool against the interior of the stock 21, as the tool rotates. Usually the stock also rotates, counter to the tool.

The tool feed is controlled by the adjustable stop nuts 27 on the draw bar 29 which is articulated (not shown) from the structure of the screw machine 15. The draw bar is slidably journalled through a catch bracket 31 which extends from the travelling frame or carriage 33 of the attachment 11. The catch member is arrested by the draw bar at a point determined by the adjustment means 27, which thereby selects the depth of the recess.

Figure 4:
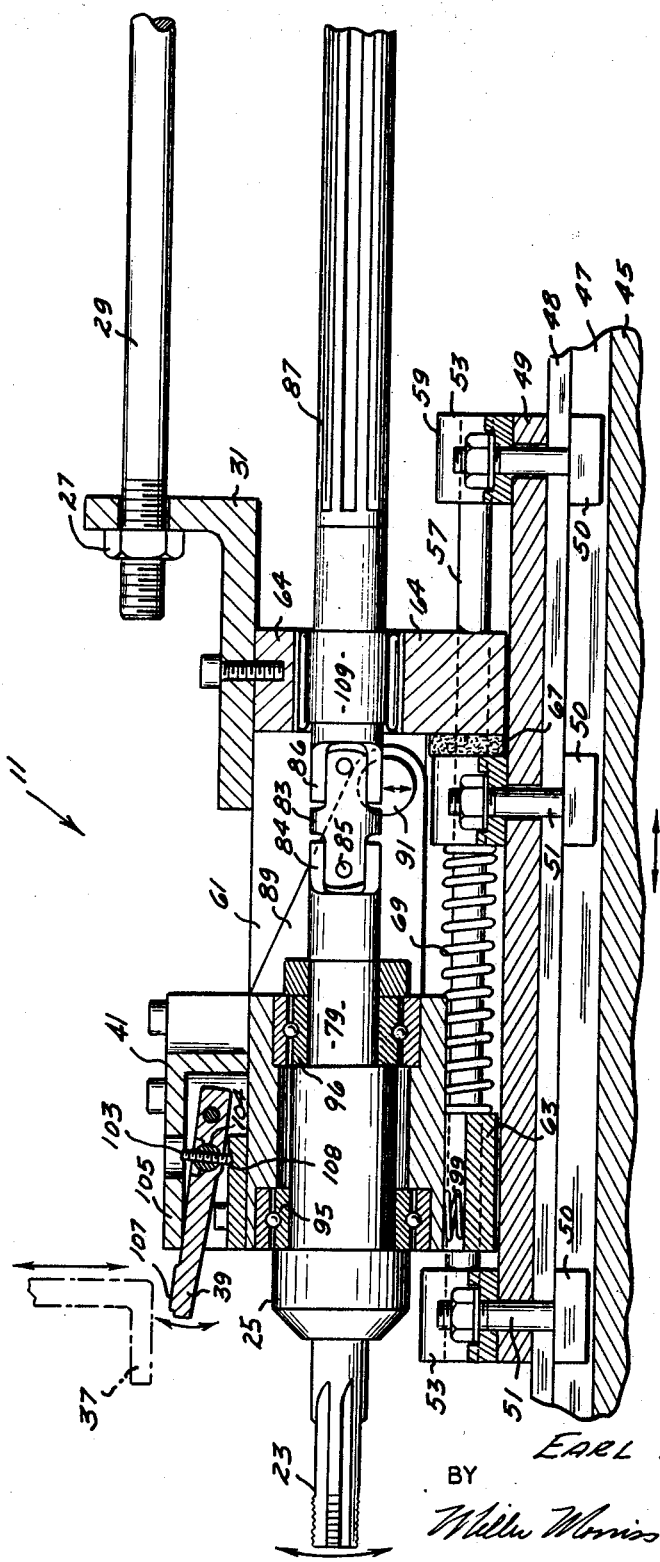
FIGURE 4 is a partially broken away sectional view taken on line IV—IV of FIGURE 3, to show a complete assembly of the apparatus of the present invention, including the external spindle swing means in phantom line, the bearing assembly for the spindle, the universal connection of the drive means thereto, draw bar means, the base plate attachment means, and a milling tool.

The size of the recess is determined by the inward, sidewise travel of the cross slide 35 and the bumper, or bump leg, 37 mounted thereon (all pertinent motions described herein are specifically indicated by arrows in FIGURE 4). The end of the bump leg 37 contacts the swing lever 39 which is pivotally supported in the lever housing 41, on lever pin 43. The lever 39 swing against the spindle block structure and thereby transforms the lateral motion of the bump leg 37 into swing motion of the spindle. This swing motion is alternatively referred to herein as "recess feed." The mechanics of the swing lever will be later described in more detail, and can be understood by reference to FIGURE 4.

Figure 1:
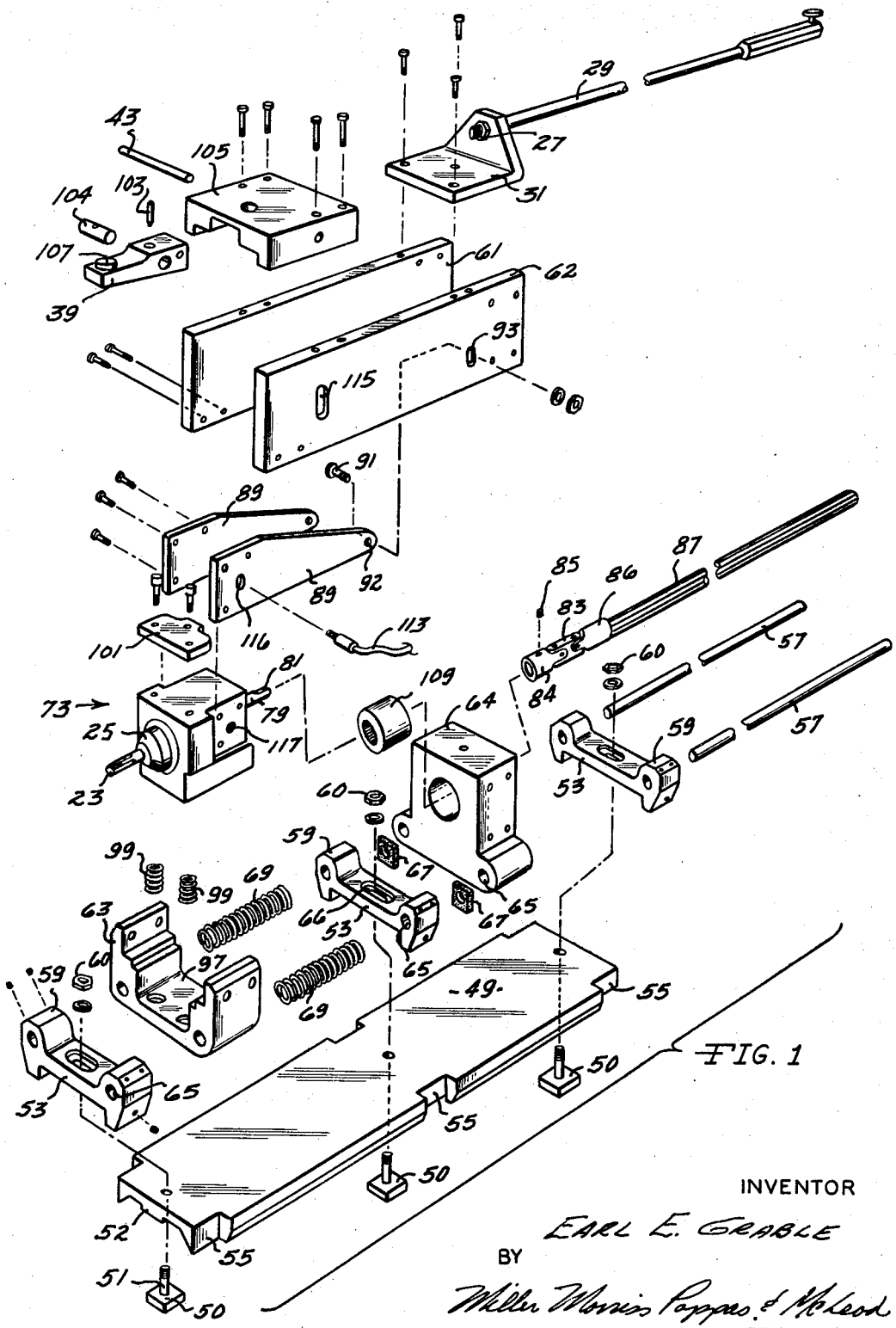
Figure 3:
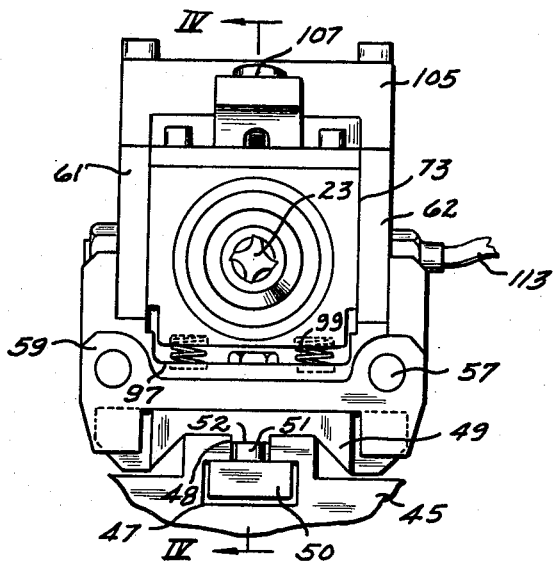
FIGURE 3 is a sectional view of the apparatus of the present invention, taken on line III—III of FIGURE 2, and shows a front elevation view of the recess milling attachment of the present invention, and the tool slide to which it attaches.

FIGURE 3 shows the tool slide 45 from its front end, and its attachment track or channel 47 beneath the lengthwise slit 48, in which the adaptable base plate 49 is guidably and adjustably secured by T-bolts 50. The shanks 51 of the T-bolts slide longitudinally in the slit portion 48 of the attachment channel 47. The base plate 49 has a lengthwise key 52 which locks into slit 48, for precise lateral positioning; the sides of plate 49 are dovetailed down around the tool slide structure. Referring momentarily to FIGURE 1, the T-bolts 50 are seen to lock three rod mounts 53 into three sets of base plate notches 55. This engagement assures a positive fore-and-aft non-slip connection.

Reference again to FIGURE 4 shows the guide rods 57 press fitted into bushings (not shown) in the ears 59 of the mounts 53, so that the bolts 50, with nuts 60, lock the tool slide, base plate, rods, and mounts all together into a single rigid sub-assembly.

Traversably mounted on the guide rods is the travelling carriage designated generally in FIGURE 1 by the numeral 33. FIGURE 4 shows the carriage more completely comprised of side plates 61 and 62 connected by end plates 63 and 64. Slide holes 65 are bored in the lengthwise direction through each of the end plates. The guide rods 57 are journalled through these holes to accommodate the sliding travel of carriage 33. Lateral adjustment of the rod mounts is provided by elongation of the bolt holes 66, in the rod mounts 59.

Forward travel of the carriage on the rods 57 is limited by interference of the rear end plate 64 with the middle rod mount 53 (see FIGURE 1). Thrust pads 67 are journalled on the rods intermediate these two interfering structures to soften the impact between them. The carriage is normally urged to a frontal position on the rods, against the pads 67, by the compression springs 69. These springs are assembled over the guide rods 57. The carriage is displaced from its normal, frontal position on the slide, or traverse, rods by the draw bar, as already explained. The springs 69 return the carriage to its normal slide position when the draw bar releases.

Considering again the carriage in FIGURE 1, the spindle block assembly is seen generally designated as 73, and includes the spindle 25, recess tool 23 and spindle input shaft 79. For purposes of illustration a slot 81 (see FIGURE 4) is displayed for connection of the shaft to the universal joint 83, by radius pin 85 which passes through the front swivel 84 of the universal. The rear swivel 86 of the universal is connected to a rotary drive shaft 87 which is normally provided on the machine at the tool slide station. However it should be appreciated that independent drive means may be utilized where the machine does not provide one. A separate source, e.g. an electric motor, would be carried by the milling attachment. The double universal joint accommodates such a mounting, and minimizes the problem of its location.

Returning to FIGURE 1, the spindle block 73 is shown bolt connected to hinge plates 89. The plates articulate from the main frame on pivot bolts 91. The bolts are carriage supported at the elongated apertures 93 in side plates 61 and 62; the hinge plates swing on the pins at holes 92. The elongated, or slot type pivot holes 93 are thus formed to enable the hinge pivot point to be laterally adjustable. The spindle pivot point is laterally variable in a plane coincident with the swing plane of the spindle, and this feature permits the spindle shaft to be offset to a selected degree.

The details of the swing spindle assembly may be better appreciated by referring primarily to FIGURE 4, with auxiliary references to FIGURES 1 and 3. The spindle 25 is seen to be journalled in each end of the spindle block 73, by ball bearings 95 and 96. The spindle block is seated in the channel 97 of the front end plate 63, and is guided therein during swing motion against the compressible swing springs 99. Attached to the upper surface of the spindle block 73 is a thrust plate 101. The springs 99 urge the spindle block to a normal position with plate 101 abutted against the bump screw 103 of the swing lever 39. The bump screw 103 may be variably oriented by rotation of the cylindrical setting plug 104. Swing lever 39 is normally swung out against the lever plate 105 bolted across the carriage side plates 61 and 62. The lever 39 includes a hardened push button 107, against which the bumper 37 cross feeds and actuates the spindle swing. The swing motion of the lever 39 and the associated swing of the spindle 25 and tool 23 are each shown by the arcuate arrows. The rectilinear motions of the cross slide mounted bumper and the tool feed are shown by straight arrows. The vertical arrow at the hinge pin 91 illustrates its lateral adjustability in the slots 93 which are seen only in FIGURE 1. It is at this adjustment point where spindle axis offset is controlled.

Swing motion (recess feed motion) does not bind or bend the drive shaft assembly. This is attributable to the double universal joint 83, which also permits offset of the shaft 79. The hinges 89 may have their pivot point shifted laterally, indicated by the arrow at the hinge pin 91, as already described. Such offsetting pivot point adjustment is essential, in order to compensate for a recess taper which would result from the arcuate path of the swinging tool 23. To eliminate this potential taper, the pivot points 107 are laterally shifted so that when the tool reaches the bottom of the recess (i.e. at completion of the cut) the tool axis is parallel to the workpiece axis. Thus, although the tool swings through a very slight arc, it ends up at the recess bottom in a precisely parallel orientation with the work piece axis, and the recess has no taper; the tool enters the interior of the work piece slightly cocked, but finishes the recess in a parallel, uncocked orientation.

The drive shaft 87 retains a constant lateral position as determined by its journalling in the needle bearings 109 seated in rear end plate 64. The rear socket 86 of the universal structure 83 may be connected to drive shaft 87 by any suitable means, for example a spline joint (not shown).

Referring now to FIGURE 1, lubricating or cutting oil may be supplied to the apparatus by oil line 113, for which a clearance slot 115 is provided in the frame side plate 62. The oil line passes through the hinge plate at 116 and connects at 117 to the spindle block 73, introducing oil directly to the bearing surfaces. This structure may also operate to introduce oil directly to the cutting tool, through a channelled shank.

It is necessary to obtain proper sequencing of the recess feed in relation to the tool feed. Control of the tool feed is easily accomplished in the same method as that used in the prior art, i.e. by the adjustable draw bar 29, as already described (draw bars are a standard accessory on many multiple spindle machines). The draw bar bracket 31 is connected across the top of side plate 61 and 62 in sliding engagement with the draw bar 29. Adjustment of the stop nuts 27 controls the extent of tool feed and the depth of the recess to be formed. Swing, or recess, is controlled independently of the machine feed, by connecting the bump leg 37 to a cross slide of the screw machine. The timing of the feed of the cross slide is easily adjusted in a manner known to the art, to properly sequence the tool feed with the recess feed. The cross feed timing is thus set up independently of the tool feed. This independence eliminates the old problems in adjusting either tool feed or recess feed. Due to the fact that in previous devices a change in one adjustment would affect the other, each procedure was tricky and time consuming.

The swing lever 39 is designed to give a reduction of motion between the bump leg and the spindle. This is evident because the bump screw 103 is closer to the lever fulcrum than is the push button 107. This leverage also incorporates a mechanical force advantage. A reduction ratio which has proved satisfactory is 3.5:1. It should be clear that other ratios are available by exchanging the lever 39 and thrust plate 101, for others having a modified location of the bump screw 103 and registering bump pocket 108, on the plate.

An alternative embodiment may be useful where no cross slide is available for cross bumping the swing lever. I use a bump drive actuated by the tool feed of the machine turret, as illustrated in FIGURES 5–8. An auxiliary plate 119 is bolted to the base plate 49. The plate 119 has a window 121 in which is bolted the heel cam 123. The cam is followed by roller 125 on the roller arm 127 which is fitted onto the spline shaft 129. The shaft is mounted in the modified lever plate 105', by the sleeve 128 and washers 130. To the other end of the shaft is fitted swing lever 131, which cooperates with the thrust plate 101', via bump screw 103', all in a fashion analogous to the operation of the standard version elements 107, 101 and 103. The cam 123, is interchangeable with others having modified cam surfaces, from which a proper size and timing of the recess feed may be selected.

Having described an operative embodiment of my invention, those skilled in the art will perceive modifications, variations, and substitutions therefor, and these should be included within the spirit of the present invention which is limited only by the scope of the hereinafter appended claims.

I claim:

1. A swinging spindle attachment for automatic screw machines of the type having a reciprocatingly fed end tool slide, comprising:
   a frame mounted on said tool slide, to reciprocatingly feed in and out thereon;
   means for controllably limiting the extent of feed-in of said frame;
   a tool holding, rotary spindle, swingably articulated from said frame;
   means for cyclically swinging said spindle toward and away from said frame, in a predetermined co-ordination with said limited feed-in of said frame; and
   rotary drive means for said spindle.

2. A swing spindle attachment for automatic screw machines of the type having a reciprocatingly fed end tool slide, comprising:
   a frame slidably mounted upon said end tool slide, and normally but yieldably disposed at a frontal position thereon for reciprocating feed therewith;
   a rotary spindle assembly swingably articulated from said frame;
   rotary drive means for said spindle;
   means to controllably arrest the feed-in of said frame at a predetermined point; and
   means for swinging said spindle toward and away from said frame in a predetermined co-ordination with said feed-in arrest of said frame.

3. The structure recited in claim 2 wherein the rotary drive means are further defined to comprise:
   a self-contained drive unit carried by said milling attachment, for use with screw machines having no rotary drive provided at said tool slide.

4. A swingable milling attachment for automatic screw machines of the type having at least one reciprocatingly fed end tool slide with a rotary drive, and draw bar means, comprising:
   a mounting assembly including
      a base plate formed for connection to said end tool slide, and traverse rods on said base plate, extending substantially parallel to said feed direction;
   a carriage slidably secured upon said base plate traverse rods and yieldably urged to a normal, frontal position thereon, and also linked in a feed-in limiting sense to said draw bar means;
   a spindle block swingably articulated from said carriage;
   a tool spindle journalled in said block and adapted for tool holding at one end of said spindle;
   a flexible drive shaft connecting the other end of said spindle to said rotary drive; and
   means for cyclically swinging said spindle block toward and away from said carriage, in a predetermined co-ordination with the limited feed-in of said carriage.

5. The structure recited in claim 4, wherein the means for swinging the spindle block more specifically comprises:
   a bumper disposed on a reciprocating cross slide of said screw machine, so as to reciprocatingly impart cyclical swing motion to said spindle block.

6. The structure recited in claim 5 with the additional structure comprising:
   a replaceable swing lever disposed on said carriage intermediate the path of said bumper and said spindle block, to translate said bumper motion into spindle block swing, the arc of which is determined by the relative position of the points of contact of said lever with said bumper and said spindle block.

7. The structure recited in claim 4, wherein the means for swinging the spindle block comprises:
   a replaceable cam actuated linkage between said mounting assembly and said spindle block, for mechanical translation of said tool slide feed motion into a spindle block swing motion, said cam being configured to determine the timing and arc of said swing.

8. The structure recited in claim 4 wherein
   (a) the pivot point of said swingable spindle block is laterally adjustable to accommodate spindle axis offset; and
   (b) said flexibility of said drive shaft is provided by a double universal joint therein, to accommodate said spindle swing and further accommodate said spindle axis offset.

9. The structure recited in claim 8, with the additional limitation comprising:
   compression springs disposed between said spindle block and said carriage, yieldably urging said block to said normal swing position; and
   compression springs coiled on said traverse rods, intermediate portions of said carriage structure and said mounting assembly structure, so as to yieldably urge said carriage to said normal, frontal position on said rods.

10. The structure set forth in claim 9 wherein the positioning of the carriage is sidewise adjustable with respect to said base plate.

References Cited

UNITED STATES PATENTS 2,677,308   5/1964   Purefoy et al. _____ 90—11.62

FOREIGN PATENTS 351,757   7/1931   Great Britain.

GERALD A. DOST, Primary Examiner

U.S. Cl. X.R.

90—15